Nov. 11, 1969 D. R. COLTON 3,477,959

METHOD AND APPARATUS FOR PRODUCING DOPED, MONOCRYSTALLINE SEMICONDUCTOR MATERIALS

Filed April 24, 1967 2 Sheets-Sheet 1

Fig. I.

Nov. 11, 1969 D. R. COLTON 3,477,959

METHOD AND APPARATUS FOR PRODUCING DOPED, MONOCRYSTALLINE SEMICONDUCTOR MATERIALS

Filed April 24, 1967 2 Sheets-Sheet 2

3,477,959

METHOD AND APPARATUS FOR PRODUCING DOPED, MONOCRYSTALLINE SEMICONDUCTOR MATERIALS

Douglas Roy Colton, Sittsville, Ontario, Canada, assignor to Northern Electric Company Limited, Montreal, Quebec, Canada Filed Apr. 24, 1967, Ser. No. 633,228
Int. Cl. H01l *3/14;* C04b *35/14*
U.S. Cl. 252—62.3 4 Claims

ABSTRACT OF THE DISCLOSURE

A method and apparatus for producing doped, monocrystalline semiconductor materials utilizing a zone-melting method for producing the monocrystalline semiconductor material. The gaseous dopant is produced in a confined space surrounding the molten zone created in the semiconductor material by the zone-melting method.

This invention relates to a method and apparatus for producing doped, monocrystalline semiconductor materials.

These are several known methods of producing single crystals of a semiconductor material, such as germanium or silicon, doped with a suitable dopant, such as antimony, aluminum, indium or gallium. These methods include gas phase doping in which a gaseous dopant is carried by a stream of inert gas, such as argon, into contact with a semiconductor which is being refined by a zone-melting process (see for example, U.S. Patents Nos. 2,897,329 H. F. Matare, July 28, 1957, and 2,904,663 R. Emeis et al., Sept. 15, 1959). The dopant reacts or diffuses into the molten zone and condenses in the semiconductor material, and thus is distributed throughout the body of the semiconductor material (see U.S. Patent No. 3,108,073, M. C. Vanik et al., Oct. 22, 1963). As mentioned in the Vanik et al. patent the dopant used in gas phase doping may be derived from a halide of the dopant element, the dopant being produced by reduction of the halide.

Another method of producing a doped single crystal of a semiconductor material is to introduce a mass of dopant into the molten zone during formation of the single crystal (see U.S. Patent No. 2,981,687, J. L. Parmee, Apr. 25, 1961).

None of the above mentioned method is generally applicable and each possesses certain disadvantages, which, depending on the type of dopant, either limit the degree of doping or result in non-uniform doping of the semiconductor material. The gas phase method of doping often proves to be unsatisfactory, because the dopant condenses in varying amounts when travelling to the molten zone and on the walls of the reaction chamber. It is also difficult in the gas phase method to program and control the dopant gas flow and the concentration in a manner which will result in uniform doping of the semiconductor material. The use of halides in gas phase doping results in undesirable reaction products such as hydrochloric acid in the case of a chloride dopant.

The object of the present invention is to provide a method and apparatus for producing doped, monocrystalline semiconductor material of improved uniformity. The method is applicable to a wide range and combination of semiconductor materials and dopants, for many of which known doping methods have proved to be unsatisfactory.

According to one aspect the invention relates to a method of producing a doped, monocrystalline semiconductor material including the steps of (a) locating an elongated seed crystal and a polycrystalline rod both of the semiconductor material in axial alignment with each other, (b) establishing a molten zone between abutting ends of said seed crystal and said polycrystalline rod in a dopant vapour atmosphere,
(c) moving said molten zone along said polycrystalline rod while rotating said seed crystal relative to said rod to grow a doped monocrystalline extension of said semiconductor material on said seed crystal;

the improvement comprising the steps of:

(d) establishing a confined space around said molten zone, and
(e) generating said dopant vapour atmosphere in said confined space by locating a suitable dopant in non-gaseous form in said confined space at a location displaced from but in the close vicinity of said molten zone.

According to another aspect, the invention relates to an apparatus for producing a doped, monocrystalline semiconductor material, said apparatus including:

(a) first chamber means,
(b) chuck means in said first chamber means for holding, in axial alignment, an elongated seed crystal and a polycrystalline rod of said semiconductor material,
(c) means for establishing a molten zone between abutting ends of said seed crystal and said polycrystalline rod,
(d) means for moving said molten zone along said polycrystalline rod, and
(e) means for rotating said seed crystal relative to said polycrystalline rod to grow a monocrystalline extension of said semiconductor material on said seed crystal, the improvement comprising:

(f) second chamber means in said first chamber means for surrounding said molten zone and defining a confined space around said molten zone, and
(g) means in said second chamber means for containing a suitable dopant in non-gaseous form in said confined space displaced from but in the close vicinity of said molten zone, whereby to enable the generation of a dopant vapour atmosphere in said confined space for doping said monocrystalline extension of the semiconductor material.

The invention will now be described with reference to the accompanying drawings, which show a preferred form of apparatus constructed in accordance with the invention, and wherein.

Figure 1:
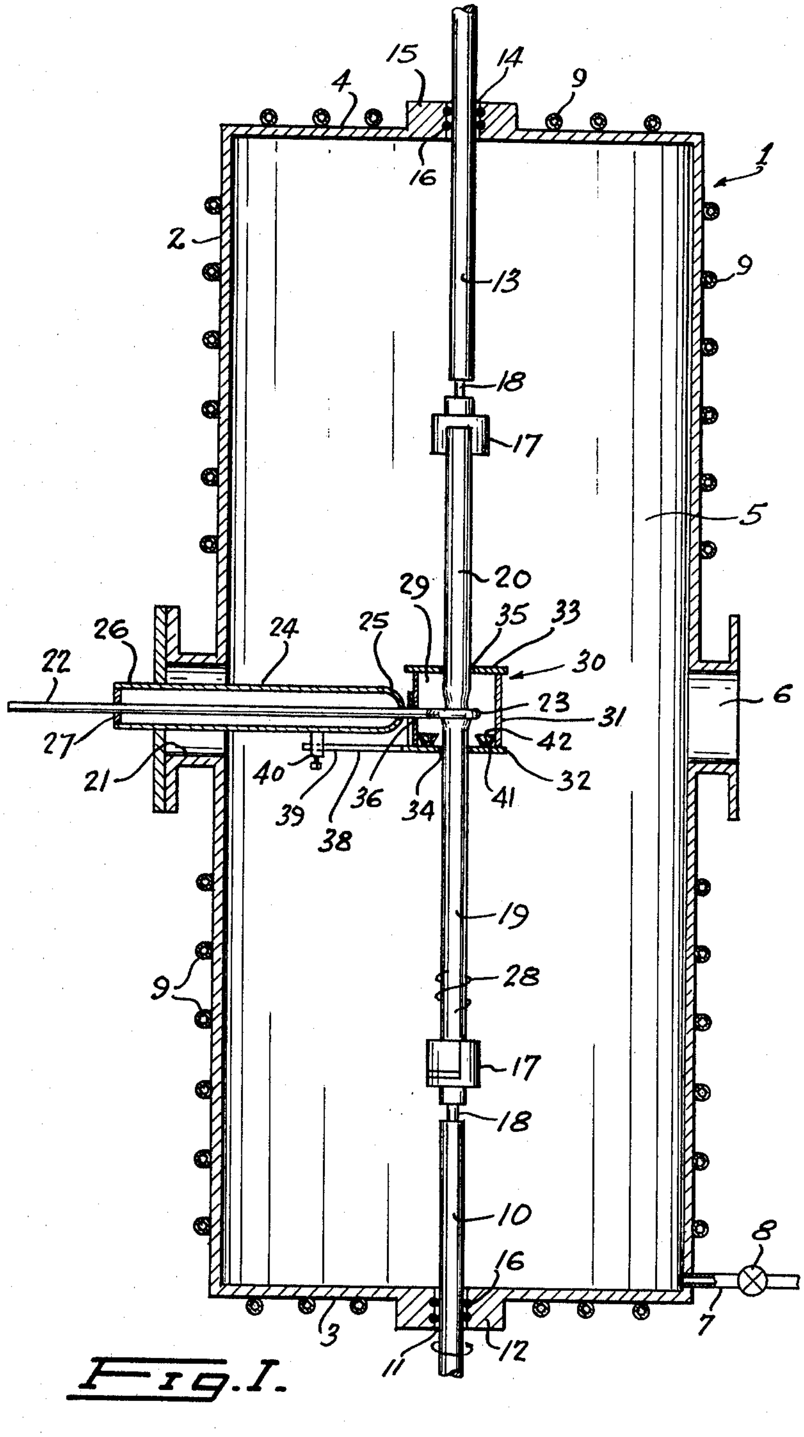
FIGURE 1 is a vertical cross-section of a preferred form of apparatus.
Figure 2:
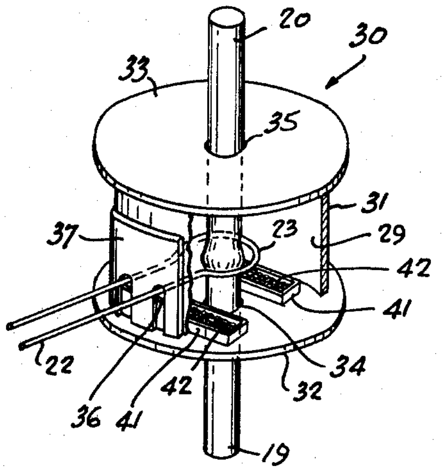
FIGURE 2 is an enlarged, partly sectioned perspective view of a portion of the apparatus of FIGURE 1.

With reference to FIGURES 1 and 2 of the drawings, the apparatus includes a cylindrical housing 1 with a side wall 2, a bottom wall 3, and a top wall 4, defining a vacuum chamber 5. The casing 1 is provided with a port 6 in the side wall 2 for connecting the chamber 5 to a vacuum pump (not shown). The casing 1 also includes an inlet duct 7 with a valve 8 through which gas can be admitted to the chamber 5. The walls 2, 3 and 4 of the housing are provided with cooling coils 9.

A control rod 10 projects upwardly into the chamber 5 through an aperture 11 in a bearing portion 12 of bottom wall 3, and a similar control rod 13, in axial alignment with rod 10, projects downwardly into the chamber 5 through an aperture 14 in a bearing portion 15 in top wall 4 of the housing 1. The apertures 11 and 14 are provided with O-rings 16 which permit axial and rotational movement of the control rods 10 and 13, while substantially preventing leakage from or into the chamber 5. A chuck 17 is mounted on the inner end 18 of each of the control rods 10 and 13 for holding an upwardly extending seed crystal 19 and a downwardly extending polycrystalline rod 20, respectively.

The side wall 2 of the housing 1 is provided with a second port 21 through which a generally U-shaped high-frequency coil 22 extends into the chamber 5, with the bight 23 of the U defining the major portion of a circle in the centre of the chamber 5. The coil 22 is in the form of a conventional hollow conductor, and is connected to a source of radio frequency alternating current (not shown). A cylindrical conductive shield 24 extends into the chamber 5 through the port 21, the shield 24 being co-axial with the centre line between the arms of the coil 22 and terminating in an inner end 25 which is closed except for apertures permitting passage of the coil 22. The outer end 26 of the shield 24 is provided with a vacuum seal in the form of a disc 27. A molybdenum wire coil 28 is provided on the seed crystal 19, the coil 28 acting as a susceptor for heating the crystal 19 until the latter couples with the field produced by the coil 22 (as more fully described below).

All of the foregoing description relates to a conventional apparatus for producing a monocrystalline rod of semiconductor material.

It has been found that the principal difficulty encountered in doping a monocrystal while it is being formed, resides in the problem of maintaining a uniform dopant vapour atmosphere around the molten zone which is formed initially at the junction of the crystals 19 and 20. If the dopant vapour is introduced with an inert carrier gas, the dopant tends to condense on the walls of the chamber 5, and the same is true if the dopant vapour is produced in situ by placing solid dopant in the molten zone.

In order to produce a uniform dopant atmosphere around the molten zone, in accordance with the present invention a chamber 29, defined by a quartz casing 30 is mounted in the chamber 5 to provide a confined space around the molten zone. The casing 30 includes a side cylindrical wall 31, a bottom wall 32 and a top wall 33. The bottom and top walls 32 and 33, include apertures 34 and 35, respectively, through which the crystals 19 and 20 extend into the chamber 29, the apertures 34 and 35 being axially aligned with the bight 23. An opening 36 is provided in the side wall 31 of the casing 30 for admission of the coil 22 into the chamber 29. A vertically slidable quartz gate 37 closes the opening 36 between the arms of the coil 22. The apertures 34 and 35, and opening 36 are only slightly larger than the elements which project through them so that very little gas tends to escape from the chamber 29.

The casing 30 is supported in the chamber 5 by a quartz rod 38, one end 39 of which is secured in a bracket 40 mounted on the shield 24.

The heat leakage from the chamber 29 can be reduced by the provision of heat shields, such as aluminum foil around the outside of the casing 30 to minimise radiation.

A pair of quartz boats 41 each containing a dopant 42 either in powder or pellet form are placed in the chamber 29 prior to the final assembly of the casing 30 in the chamber 5.

Figure 3:
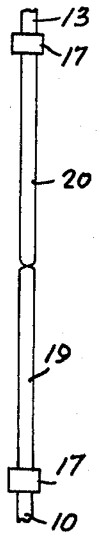
FIGURES 3 to 7 are schematic diagrams of a seed crystal and polycrystalline rod showing the steps in the process of the invention.
Figure 4:
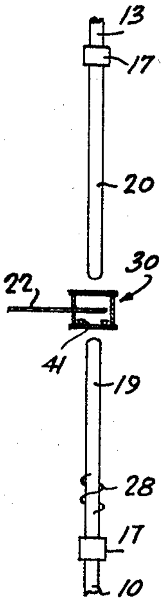

In operation, with the monocrystalline seed crystal 19 mounted in the chuck 17 of control rod 10 and the polycrystalline rod 20 mounted in the chuck 17 of control rod 13, the crystal 19 and the rod 20 are brought together (see FIGURE 3) to ensure that they are axially aligned. If the crystal 19 and rod 20 are not aligned, adjustments can be made to the chucks 17 to align them. The crystal 19 and rod 20 are then separated, as shown in FIGURE 4, while the quartz casing 30 containing the solid elemental dopant 42 in boats 41, is introduced into the chamber 5.

With the casing 30 in position, chamber 5 is sealed, evacuated to approximately $10^{-4}$ torr and flushed with high purity argon. The evacuation and flushing steps are repeated three times, and the chamber 5 is finally evacuated to approximately $10^{-5}$ torr. An inert gas, preferably argon, is then admitted to the chamber 5 through duct 7 and valve 8 to establish the desired atmosphere in the chamber 5. When argon is used the pressure in the chamber 5 is preferably one atmosphere.

Figure 5:
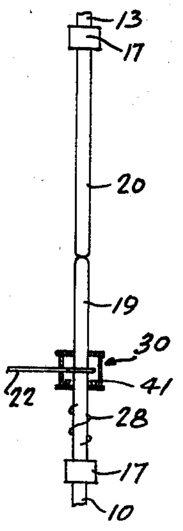

The seed crystal 19 is raised to abut the lower end of the polycrystalline rod 20 (FIGURE 5) so that the molybdenum wire coil 28 is located close enough to the bottom wall 32 of the casing 30 that it will couple electrically with the coil 22. High frequency power is applied to the coil 22 until the molybdenum wire susceptor 28 becomes red hot and heats the crystal 19 thus rendering the latter sufficiently conductive to couple with the R.F. field of the coil 22 to produce a hot but not yet molten zone in the crystal 19.

Figure 6:
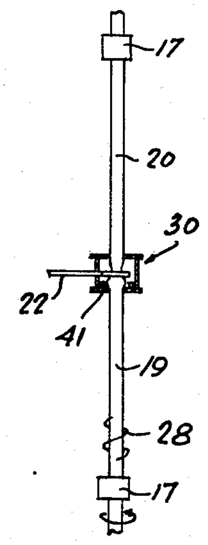
Figure 7:
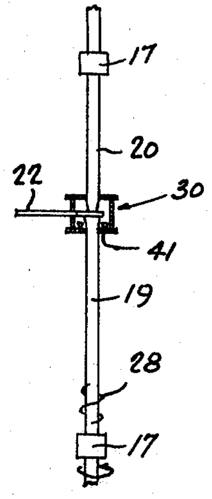

Ultra-high frequency power sources that have recently become available would obviate the need for the molybdenum susceptor 28. The crystal rod assembly, including seed crystal 19 and polycrystalline rod 20, is then slowly lowered until this hot zone is at the junction between the crystal 19 and rod 20, as shown in FIGURE 6. The power in the coil 22 is then increased to establish a molten zone at the junction between the seed crystal 19 and the rod 20. Then, while the seed crystal 19 is rotated at about a few revolutions per minute the whole crystal rod assembly is moved slowly downwardly to grow a monocrystalline extension of the seed crystal 19 from material melted from the rod 20 (FIGURE 7).

During the application of power to the coil 22, the dopant 42 in the boats 41 melts and forms an atmosphere of dopant vapour in the chamber 29. The heat which melts the solid dopant 42 is derived solely from the molten zone, which is formed by coupling of the crystal rod assembly with the coil 22. Heat from the molten zone is sufficient to maintain a dopant vapour atmosphere in the chamber 29, while preventing condensation of dopant on the walls of the chamber. The only source of heat in the chamber 29 is the molten zone from which heat is transmitted by convection and radiation to the walls of the casing 30 and to the dopant 42. The confined space provided by chamber 29 and the inert gas atmosphere surrounding the chamber substantially prevent the escape of dopant vapour from the area immediately surrounding the molten zone.

The dopant vapour diffuses into the molten zone, and is condensed in the monocrystalline rod being formed by the passage of the molten zone along the polycrystalline rod. Thus a doped monocrystalline rod is formed.

Suitable semiconductor materials for the rod assembly include silicon and germanium. Suitable dopants for either germanium or silicon include antimony, aluminum, indium and gallium, and for silicon, scandium. It will be noted that suitable dopants for use in the present invention have a melting point lower than that of the semiconductor material, and a boiling point higher than the melting point of the semiconductor material.

I claim:

1. In a method of producing a doped, monocrystalline semiconductor material including the steps of:

(a) locating an elongated seed crystal and a polycrystalline rod both of the semiconductor material in axial alignment with each other, (b) establishing a molten zone between abutting ends of said seed crystal and said polycrystalline rod in a dopant vapour atmosphere, (c) moving said molten zone along said polycrystalline rod while rotating said seed crystal relative to said rod to grow a doped monocrystalline extension of said semiconductor material on said seed crystal;

the improvement comprising the steps of:

(d) establishing a confined space around said molten zone, and (e) generating said dopant vapour atmosphere in said confined space by locating a suitable dopant in non-gaseous form in said confined space at a location displaced from but in the close vicinity of said molten zone.

2. The method of claim 1 wherein said dopant vapour atmosphere is generated by heat derived solely from said molten zone.

3. The method of claim 1 wherein said semiconductor material is silicon, and said dopant is selected from the group consisting of elemental antimony, aluminum, indium, gallium and scandium.

4. The method of claim 1 wherein said semiconductor material is germanium, and said dopant is selected from the group consisting of elemental antimony, aluminum, indium and gallium.

References Cited

UNITED STATES PATENTS

| | | | |
|---|---|---|---|
| 3,036,892 | 5/1962 | Siezertz | 148—171 XR |
| 3,141,848 | 7/1964 | Enk et al. | 252—62.3 |

L. DEWAYNE RUTLEDGE, Primary Examiner

P. WEINSTEIN, Assistant Examiner

U.S. Cl. X.R.

23—223.5, 272, 301; 148—1.6, 171, 172